United States Patent
Cook et al.

(10) Patent No.: US 12,028,174 B2
(45) Date of Patent: Jul. 2, 2024

(54) REMOTE MONITORING AND POWER CYCLING OF BROADBAND AND WIRELESS DEVICES

(71) Applicant: Charter Communications Operating, LLC, St. Louis, MO (US)

(72) Inventors: Charles Cook, Castle Rock, CO (US); John Williams, Aurora, CO (US); Roger Stafford, Thornton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 184 days.

(21) Appl. No.: 17/851,174

(22) Filed: Jun. 28, 2022

(65) Prior Publication Data
US 2023/0421403 A1 Dec. 28, 2023

(51) Int. Cl.
| | |
|---|---|
| *H04L 12/10* | (2006.01) |
| *H04W 4/20* | (2018.01) |
| *H04W 84/04* | (2009.01) |
| *H04W 88/08* | (2009.01) |

(52) U.S. Cl.
CPC ............ *H04L 12/10* (2013.01); *H04W 4/20* (2013.01); *H04W 84/04* (2013.01); *H04W 88/085* (2013.01)

(58) Field of Classification Search
CPC . H04L 12/10; H04L 12/2801; H04L 12/2869; H04W 4/20; H04W 84/04; H04W 88/085
See application file for complete search history.

(56) References Cited

U.S. PATENT DOCUMENTS

| | | | |
|---|---|---|---|
| 8,365,018 B2 * | 1/2013 | McIntosh | H04L 43/50 709/224 |
| 8,543,008 B2 | 9/2013 | Soto et al. | |
| 9,252,842 B2 | 2/2016 | Mutzabaugh | |
| 10,291,336 B1 * | 5/2019 | Leaf | H01Q 21/28 |
| 10,951,712 B2 | 3/2021 | Brantner et al. | |
| 2005/0204078 A1 * | 9/2005 | Steinmetz | G06F 3/0689 710/38 |
| 2009/0013210 A1 * | 1/2009 | McIntosh | H04L 43/10 714/E11.113 |
| 2017/0353346 A1 * | 12/2017 | Pfeffer | H04L 12/10 |
| 2018/0054347 A1 * | 2/2018 | Kojima | H04N 23/661 |
| 2018/0067510 A1 | 3/2018 | Ewing et al. | |

* cited by examiner

*Primary Examiner* — Eunsook Choi
(74) *Attorney, Agent, or Firm* — Young Basile Hanlon & MacFarlane, P.C.

(57) ABSTRACT

A network includes a centralized power and signal distribution device deployed at a communication closet at a site. The centralized device includes a switch controller connected to a direct current power supply. The network includes at least one customer premises termination device connected to the switch controller, an access apparatus deployed at each of the multiple customer premises, and a power over cable system to carry power and signals. Each access apparatus connected to the at least one customer premises termination device and to provide access to user devices. The switch controller power cycles at least one of the switch controller, the at least one customer premises termination device, or applicable access apparatus in response to a power cycle command from a controller when at least one of the switch controller, the at least one customer premises termination device, or any access apparatus fail to transmit a status signal.

18 Claims, 8 Drawing Sheets

REMOTE MONITORING AND POWER CYCLING OF BROADBAND AND WIRELESS DEVICES

TECHNICAL FIELD

This disclosure relates to telecommunications. More specifically, providing remote monitoring and controlling capabilities of broadband and wireless equipment deployed at a customer premises.

BACKGROUND

Telecommunications service providers provide cable, television, Internet, voice, data and other services (collectively "services") to a customer by deploying equipment at the customer's premises and connecting the equipment back to the service provider's central office via an access network. In most cases, the equipment is powered by a 110 volts AC mains power system. The customer's premises may not have sufficient or conveniently located mains outlets at the preferred or recommended installation position. Consequently, an electrician is required. This can be inconvenient and inefficient.

The inconvenience and inefficiency is exacerbated when the customer is located in a multi-dwelling unit (MDU), where a building owner or management company contracts with the service provider to provide the services and all of the equipment, including but not limited to, a centralized cable signal distribution system, modems, and access devices. This can be complicated in the instance where the building owner may be paying the electricity and the customer is paying for the services.

In addition, deployment can be complicated by having coaxial or cable infrastructure within and outside of the building. In these deployments, there are two sets of equipment. First, there is the service provider or building management owned coaxial cable infrastructure and distribution system. This is normally deployed and distributed from a service room, communications cabinet, distribution closet, or communications closet (collectively "communications closet"). In some instances, these communications closet may lack a mains outlet. Second, there are the customer premises equipment (CPE) devices, such as high-speed data modems which are located within each dwelling unit in the MDU. Powering both sets of equipment requires existing power outlets to be exactly located in the communications closet and sufficient mains outlets in each dwelling unit. However, power outlets are not always present in the communications closet or the dwelling unit. The electrician needs to add additional outlets, which is expensive, incurs installation delays, and requires city issued commercial permits and inspections.

Moreover, problems can occur with the deployed equipment. This can require having to deploy service provider personnel to the customer premises to correct the issues.

SUMMARY

Disclosed herein are methods and systems for remote monitoring and controlling of broadband and wireless equipment deployed at a customer premises.

In some implementations, a network is deployed at a site with multiple customer premises. The network includes a centralized power and signal distribution device deployed at a communication closet at the site, the centralized power and signal distribution device including a switch controller connected to a direct current (DC) power supply, at least one customer premises termination device connected to the switch controller, an access apparatus deployed at each of the multiple customer premises at the site, each access apparatus connected to the at least one customer premises termination device and configured to provide access to user devices and a power over cable system configured to carry power and signals between the centralized power and signal distribution device and each access apparatus. The switch controller is configured to power cycle at least one of the switch controller, the at least one customer premises termination device, or applicable access apparatus in response to receiving a power cycle command from a controller when at least one of the switch controller, the at least one customer premises termination device, or any access apparatus fail to transmit a status signal to the controller.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
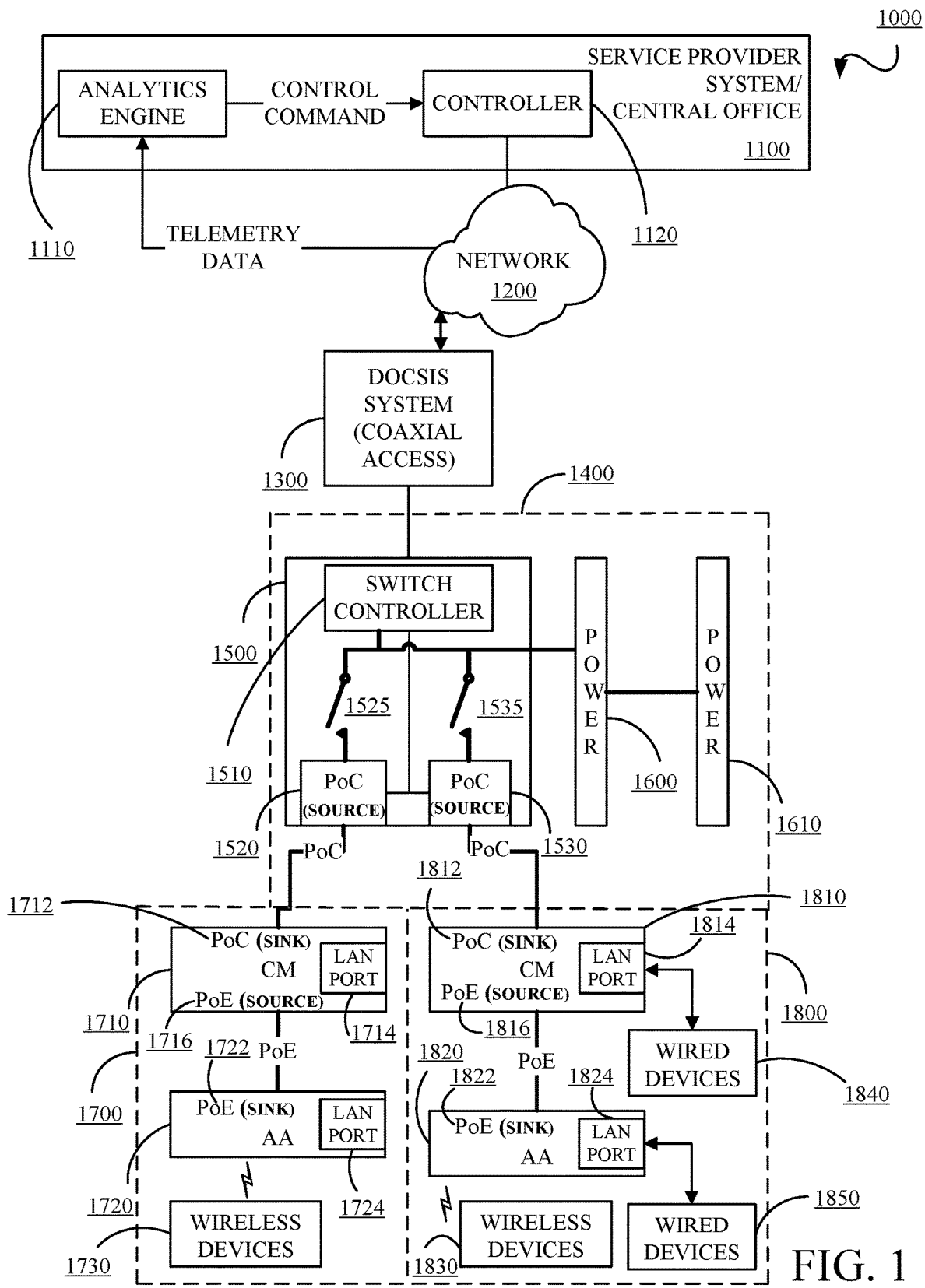
FIG. 1 is a diagram of an example of a network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for remote monitoring and controlling of deployed broadband and wireless equipment in accordance with some embodiments. The system includes a centralized power distribution device which can be connected to or include a direct current (DC) power supply, which in turn can be connected to a mains power. In some implementations, a back-up power system can be connected to the DC power supply. Power over Coaxial (PoC) or Power over Ethernet (PoE) systems (collectively "power over cable systems") can be used to distribute power to CPE devices such as, but not limited to, cable modems, modems, access points, and the like from the centralized power distribution device. Using DC mitigates affecting the RF spectrum being carried on the connector cable. In addition, placement of the CPE devices can be independent of main power outlet placement or availability. Moreover, the back-up power system can enable a fault tolerant system.

In some implementations, the system can include a controller or watchdog device in communication with internet protocol (IP) or uniquely addressable switches at or in the centralized power distribution device. The controller can remotely monitor and control the CPE devices connected to the centralized power distribution device via the power over cable systems. In these implementations, the CPE devices are internet protocol (IP) or uniquely addressable CPE devices. The controller can listen for a heartbeat signal from a CPE device, ping a CPE device, or combinations thereof to monitor operability. The controller can send a message to the IP addressable switches to power cycle inoperable CPE devices. The controller sets the amount of time that the CPE devices are off based on the type of device. The system maximizes the amount of time the connected CPE devices are operating correctly and mitigates the number of times service provider personnel have to be sent to the customer premises.

In some implementations, the controller can measure power consumption of the deployed cable equipment, in each dwelling unit of a multiple dwelling unit, and/or combinations thereof.

In some implementations, the system is a self-correcting system which includes centralized and switchable power distribution using power over cable systems to effectively and efficiently power cycle subtended devices based on control signaling between a controller, a switch controller, and devices connected to the switch controller.

In some implementations, the system provides a centrally controlled system of power control, heartbeat generation and/or device pinging, and health assessment designed to minimize service provider truck rolls to provide maintenance services on equipment at a customer premises. The centrally controlled system of power control enables the use of a back-up power system in the event of mains failure.

FIG. 1 is a diagram of an example network architecture 1000 in accordance with some embodiments. The architecture 1000 can include a service provider central office, hub, or headend (collectively "central office") 1100 which can provide services to customer premises, such as customer premises 1700 and 1800, via a network 1200, an access network, such as DATA OVER CABLE SERVICE INTERFACE SPECIFICATION (DOCSIS) system 1300, and communications closet 1400. The customer premises 1700 and 1800 can be living units (LU) in a residence, dwelling units (DUs) in a multi-dwelling unit (MDU), office space, and the like. The customer premises can be physically separated and/or logically separated (as between different owners or tenants). Communications between the described elements and components contained therein can include wired communications, wireless communications, or a combination thereof. The quantity of described devices or elements is illustrative. The network architecture 1000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The central office 1100 can include an analytics engine 1110 and a controller 1120. The communications closet 1400 can include a centralized power distribution device 1500 and a DC power supply 1600. In some implementations, the communications closet 1400 can include a back-up power supply 1610. The centralized power distribution device 1500 can include, but is not limited to, a switch controller 1510 and one or more PoC sources, such as PoC source 1520 and 1530, corresponding to the number of customer premises being served by the communications closet 1400 or the centralized power distribution device 1500. The customer premises 1700 can include, but is not limited to, a cable modem 1710, an access apparatus 1720, and one or more user devices, such as wireless devices 1730. The customer premises 1800 can include, but is not limited to, a cable modem 1810, an access apparatus 1820, and one or more user devices, such as wireless devices 1830, wired devices 1840, and wired devices 1850. The cable modem 1710 can include, but is not limited to, a PoC sink 1712, a local area network (LAN) port 1714, and a PoE source 1716. The access apparatus 1720 can include, but is not limited to, a PoE sink 1722 and a LAN port 1724. The cable modem 1810 can include, but is not limited to, a PoC sink 1812, a LAN port 1814, and a PoE source 1816. The access apparatus 1820 can include, but is not limited to, a PoE sink 1822 and a LAN port 1824.

The analytics engine 1110 is connected to the controller 1120, both of which are in turn connected to or in communication with (collectively "connected to") the network 1200. The network 1200 is connected to the DOCSIS system 1300. The DOCSIS system 1300 is connected to the switch controller 1510, the PoC source 1520, and the PoC 1530. The PoC source 1520 and the PoC source 1530 are connected to the DC power supply 1600 via switches 1525 and 1535, respectively. The DC power supply 1600 is connected to the back-up power supply 1610, if available. The switch controller 1510 is connected to the switches 1525 and 1535. The PoC source 1520 and the PoC source 1530 are connected to the PoC sink 1712 and the PoC sink 1812, respectively. The PoE source 1716 and PoE source 1816 are connected to the PoE sink 1722 and the PoE sink 1822, respectively. The wireless devices 1730 are wirelessly connected to the cable modem 1710 and/or the access apparatus 1720. The wireless devices 1830 are wirelessly connected to the cable modem 1810 and/or the access apparatus 1820. The wired devices 1840 are connected to the LAN port 1814. The wired devices 1850 are connected to the LAN port 1824.

The central office 1100 can include, but is not limited to, the analytics engine 1110, the controller 1120, servers, switches, transceivers, optical line terminal, and other equipment configured to transmit or stream downstream signals including data, content, and commands to the customer premises and receive upstream signals including telemetry data from the customer premises via the DOCSIS system 1300, Ethernet, wired, and wireless communication paths.

The controller 1120 can control or manage the switch controller 1510 to enable or disable the switches 1525 and 1535, which results in a power cycling of subtended devices. In some implementations, the controller 1120 can receive heartbeat messages from the subtended devices including the switch controller 1510, the cable modem 1710, the cable modem 1810, the access apparatus 1720, the access apparatus 1820, or combinations thereof. The controller 1120 can initiate a power cycle in case of an absence of a heartbeat message for a defined period of time, in case there is a defined number of absences, or combinations thereof. In some implementations, the controller 1120 can ping subtended devices. The controller 1120 can initiate a power cycle in case a response to the ping is not received in a defined period of time, in case there is a defined number of missing responses, or combinations thereof.

The analytics engine 1110 can receive telemetry data from the switch controller 1510, the cable modem 1710, the cable modem 1810, the access apparatus 1720, the access apparatus 1820, the wireless devices 1730, the wireless devices 1830, the wired devices 1840, the wired devices 1850, or combinations thereof. The analytics engine 1110 can detect patterns or predict operability changes based on the telemetry data and send commands to the controller 1120 to initiate power cycling of the appropriate device.

The switch controller 1510 is a uniquely addressable or identifiable switch controller. In some implementations, the switch controller 1510 is an IP addressable switch controller. The switch controller 1510 turns power off and on to subtended devices based on control or command signals received from the controller 1120. This results in power cycling of the appropriate subtended devices. In some implementations, the switch controller 1510 can send heartbeat messages to the analytics engine 1110, the controller

1120, or combinations thereof. In some implementations, the switch controller 1510 can send response messages to the analytics engine 1110, the controller 1120, or combinations thereof in response to ping or maintenance (collectively "ping") messages sent by the controller 1120. In some implementations, the switch controller 1510 can send telemetry data to the analytics engine 1110.

The DC power supply 1600 can be a DC converter device which is plugged into a mains power supply at a customer premises. The DC power supply 1600 together with the PoC and PoE enabled devices enable centralized distribution of power and communications to the customer premises. Placement of the subtended devices are not dependent on main power outlets and can be placed for service effectiveness in the customer premises.

The PoC system including the PoC source 1520, the PoC source 1530, the PoC sink 1712, the PoC sink 1812, and associated PoC connectors or cabling can carry the DOCSIS signals from the DOCSIS system 1300 and power from the DC power supply 1600 to the cable modem 1710 and the cable modem 1810, respectively. The PoC source 1520, the PoC source 1530, the PoC sink 1712, and the PoC sink 1812 are circuits, devices and/or combinations thereof.

The PoE system including the PoE source 1716, the PoE source 1816, the PoE sink 1722, the PoE sink 1822, and associated PoE connectors or cabling can carry signals and power from the cable modem 1710 and the cable modem 1810 to the access apparatus 1720 and access apparatus 1820, respectively. The PoE source 1716, the PoE source 1816, the PoE sink 1722, and the PoE sink 1822 are circuits, devices and/or combinations thereof.

The cable modem 1710 and the cable modem 1810 can be cable modems, cable modem routers, and like devices which act as a termination device for the DOCSIS system 1300. Each of the cable modem 1710 and the cable modem 1810 can include a PoC sink 1712 and 1812, respectively, and a PoE source 1716 and 1816, respectively, to transmit power to the access apparatus 1720 and 1820, respectively. Each of the cable modem 1710 and the cable modem 1810 can include a LAN port 1714 and 1814, respectively, to provide Ethernet connection for wired devices. In some implementations, the cable modem 1710 and the cable modem 1810 can provide wireless or WiFi connectivity to wireless devices. In some implementations, the cable modem 1710 and the cable modem 1810 can be uniquely addressable or identifiable. In some implementations, the cable modem 1710 and the cable modem 1810 can be IP addressable. In some implementations, the cable modem 1710 and the cable modem 1810 can send heartbeat messages to the analytics engine 1110, the controller 1120, or combinations thereof. In some implementations, the cable modem 1710 and the cable modem 1810 can send response messages to the analytics engine 1110, the controller 1120, or combinations thereof in response to ping messages sent by the controller 1120. In some implementations, the cable modem 1710 and the cable modem 1810 can send telemetry data to the analytics engine 1110.

The access apparatus 1720 and access apparatus 1820 can be, but is not limited to, a base station, an access point, an access node, wireless router, or like device which enables radio communications access for the wireless devices. In some implementations, the access apparatus 1720 and access apparatus 1820 can include a LAN port 1724 and 1824, respectively, to provide Ethernet connection for wired devices. The access apparatus 1720 and access apparatus 1820 can include a PoE sink 1722 and 1822, respectively, to receive signals and power from the cable modem 1710 and the cable modem 1810, respectively. In some implementations, the access apparatus 1720 and access apparatus 1820 can be uniquely addressable or identifiable. In some implementations, the access apparatus 1720 and access apparatus 1820 can be IP addressable. In some implementations, the access apparatus 1720 and access apparatus 1820 can send heartbeat messages to the analytics engine 1110, the controller 1120, or combinations thereof. In some implementations, the access apparatus 1720 and access apparatus 1820 can send response messages to the analytics engine 1110, the controller 1120, or combinations thereof in response to ping messages sent by the controller 1120. In some implementations, the access apparatus 1720 and access apparatus 1820 can send telemetry data to the analytics engine 1110.

The wireless devices 1730, the wireless devices 1830, the wired devices 1840, and the wired devices 1850 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the cable modem 1710, the cable modem 1810, the access apparatus 1720, and/or the access apparatus 1820, respectively.

Operationally and functionally, a service provider provisions a customer premises with the centralized power distribution device 1500, the DC power supply 1600, one or more cable modems, and one or more access apparatus. One such provisioning can be as shown in FIG. 1 with respect to the components described for customer premises 1700 and customer premises 1800. In this instance, the cable modem 1710, the cable modem 1810, the access apparatus 1720, and the access apparatus 1820.

In the network architecture 1000, the controller 1120 is a watchdog controller which passively or actively monitors the operational connectivity status of the uniquely identifiable switch controller 1510, the cable modem 1710, the cable modem 1810, the access apparatus 1720, and the access apparatus 1820 (all of which are collectively referred to as subtended devices with respect to the controller 1120 and where the latter four components are referred to as switch subtended devices with respect to the switch controller 1510) to maximize the time that the subtended devices are operating correctly and to minimize the number of truck rolls or maintenance calls to the customer premises. The controller 1120 (and/or the analytics engine 1110) controls the switch controller 1510 to turn off and on the power as needed to power cycle a subtended device. The controller 1120 (and/or the analytics engine 1110) can reach the uniquely identifiable or IP addressable switch controller 1510 to determine whether the switch controller 1510 turned on and off the switch as commanded. In some implementations, the switch controller 1510 can send an acknowledgement to the command.

The control signaling between the controller 1120 (and/or the analytics engine 1110) and the subtended devices is sent or transmitted over the coaxial cable associated with the DOCSIS system 1300 (or fiber cable in optical access networks) and the Ethernet cable. Control signaling can be communicated when the connection is up. When the connection is down, the data or information, such as telemetry data or device status, can be collected or stored at a subtended device and sent after the connection is restored. The controller 1120 (and/or the analytics engine 1110) can use the control signaling to reboot subtended devices. For example, if a loss of communications connectivity is detected in the link between the cable modem 1710 and the access apparatus 1720 or between the access apparatus 1720 and the wireless devices 1730, the controller 1120 can reboot the cable modem 1710, the access apparatus 1720, or both. In another example, the same process can be applied to a loss of communications connectivity between any devices that are subtended to the controller 1120. In some implementations, the control signaling between the controller 1120 (and/or the analytics engine 1110) and the subtended devices can be encrypted to provide secure and safe communications.

The controller 1120 (and/or the analytics engine 1110) and the switch controller 1510 collectively control the power to each of the customer premises 1700 and 1800 and the devices therein via the power over cable systems, namely, the PoC and PoE systems to power cycle subtended devices or switch subtended devices. Power cycling is the process of turning the power to the devices off, waiting for a predetermined length of time, and reapplying or turning on the power, which causes the appropriate devices to power cycle and reset to a known state. The length of time to wait is based on the length of time that it takes for power to fully dissipate from the device so that there is no residual power that may prevent the clearing of the memory in the device (referred to herein as a "full power cycle"). This delay time is determined ahead of time and is stored in memory accessible by controller 1120, the analytical engine 1110, or combinations thereof. Advantageously, the system has the ability to remotely manage multiple types of devices from multiple vendors that may have different electrical characteristics that govern how a device power cycles. Some devices power cycle differently based on how long power is removed. For example, removal of power for less than 10 seconds may result in a power cycle that does not remove certain values in device memory (referred to herein as a "partial power cycle"). However, removal of power for longer than 10 seconds can result in a power cycle where the certain values in the device memory default to a known state (a full power cycle). That is, the controller 1120 (and/or the analytics engine 1110) can reset subtended devices via a full power cycle or a partial power cycle. Moreover, the controller 1120 (and/or the analytics engine 1110) can set the waiting interval depending on the type of subtended device.

In some implementations, the switch controller 1510 can monitor and store information that can be retrieved by the controller 1120 (and/or the analytics engine 1110). For example, the switch controller 1510 can store information as to when the mains power failed, when the mains power was restored, when the switch controller 1510 was on, when the switch controller 1510 was off, statistics on how often power cycles have occurred during a specified time interval, information from the switch subtended devices, and/or other related information. In some implementations, each of the switch controller 1510, the cable modem 1710, the cable modem 1810, the access apparatus 1720, and the access apparatus 1820 can include sensors that measure humidity, temperature, light or other environmental conditions. This information can be used by the analytics engine 1110, along with the other information described herein (collectively "telemetry data"), to determine patterns or detect conditions as to when a subtended device may fail and necessitate a power cycle, i.e., an operational failure pattern. In this instance, the analytics engine 1110 can send a command to the controller 1120, which in turn commands the switch controller 1510 to switch power off and on as needed to power cycle a subtended device.

In some implementations, the controller 1120 (and/or the analytics engine 1110) can reach each uniquely identifiable or IP addressable subtended device to determine whether the subtended device is on or off. That is, the controller 1120 can send a ping message or otherwise establish communications with the subtended devices. The controller 1120 attempts to establish communications with the subtended device on a programmable periodic basis. If the controller 1120 does not receive a response from the subtended device, the controller 1120 attempts a defined number of times to establish communications. After not receiving a response for a defined number of times, the controller 1120 assumes that the subtended device is not functioning properly and sends a commands to the switch controller 1510 to power cycle the switch subtended device(s). In this instance, this enables the controller 1120 to proactively power cycle subtended devices at a time when it is unlikely that the user will be actively using the device (e.g., the middle of the night). For example, this active monitoring by the controller 1120 can reset devices with memory leaks or other issues that over time result in the device locking up.

In some implementations, the controller 1120 can receive heartbeat signals or messages from the subtended devices. When the controller 1120 fails to receive the heartbeat for a predetermined length of time, it can assume that the subtended device is locked up. The controller 1120 can then transmit a command to the switch controller 1510 to power cycle the subtended device. In some implementations, the subtended devices can include sensors that measure humidity, temperature, light or other environmental conditions as described herein. Information or data from these sensors can be included in the heartbeat messages and be analyzed by the analytics engine 1110 as described herein to determine next actions, including, for example, a power cycle. In some implementations, the heartbeat message can include a dying gasp loss of power message. The controller 1120 can use this in conjunction with information retrieved from the switch controller 1510 to infer power issues and determine next actions, including, for example, a power cycle.

Figure 2:
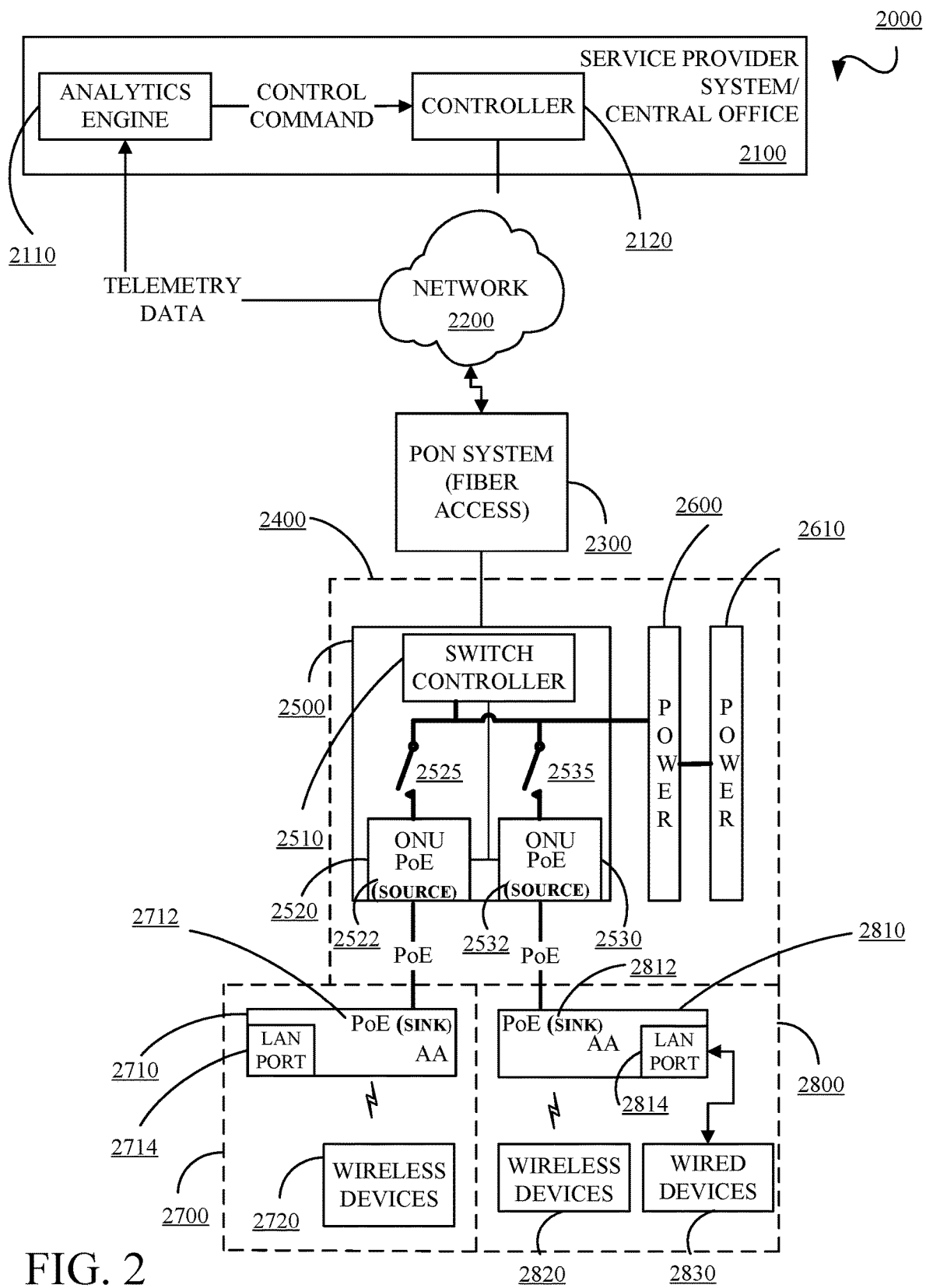
FIG. 2 is a diagram of an example of a network architecture in accordance with embodiments of this disclosure.

FIG. 2 is a diagram of an example network architecture 2000 in accordance with some embodiments. The architecture 2000 can include a service provider central office, hub, or headend (collectively "central office") 2100 which can provide services to customer premises, such as customer premises 2700 and 2800, via a network 2200, an access network, such as passive optical network (PON) system 2300, and communications closet 2400. The customer premises 2700 and 2800 can be LU in a residence, DUs in a MDU, office space, and the like. The customer premises can be physically separated and/or logically separated (as between different owners or tenants). Communications between the described elements and components contained therein can include wired communications, wireless communications, or a combination thereof. The quantity of described devices or elements is illustrative. The network architecture 2000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The central office 2100 can include an analytics engine 2110 and a controller 2120. The communications closet 2400 can include a centralized power distribution device 2500 and a DC power supply 2600. In some implementations, the communications closet 2400 can include a back-up power supply 2610. The centralized power distribution device 2500 can include, but is not limited to, a switch controller 2510 and one or more optical networking units (ONUs), such as ONU 2520 and ONU 2530, corresponding to the number of customer premises being served by the communications closet 2400 or the centralized power distribution device 2500. The ONU 2520 can include a PoE source 2522 and the ONU 2530 can include a PoE source 2532. The customer premises 2700 can include, but is not limited to, an access apparatus 2710 and one or more user devices, such as wireless devices 2720. The customer premises 1800 can include, but is not limited to, an access apparatus 2810 and one or more user devices, such as wireless devices 2820 and wired devices 2830. The access apparatus 2710 can include, but is not limited to, a PoE sink 2712 and a LAN port 2714. The access apparatus 2810 can include, but is not limited to, a PoE sink 2812 and a LAN port 2814.

The analytics engine 2110 is connected to the controller 2120, both of which are in turn connected to or in communication with (collectively "connected to") the network 2200. The network 2200 is connected to the PON system 2300. The PON system 2300 is connected to the switch controller 2510, the ONU 2520/PoE source 2522, and the ONU 2530/PoE source 2532. The PoE source 2522 and the PoE source 2532 are connected to the DC power supply 2600 via switches 2525 and 2535, respectively. The DC power supply 2600 is connected to the back-up power supply 2610, if available. The switch controller 2510 is connected to the switches 2525 and 2535. The PoE source 2522 and the PoE source 2532 are connected to the PoE sink 2712 and the PoE sink 2812, respectively. The wireless devices 2720 are wirelessly connected to the access apparatus 2710. The wireless devices 2820 are wirelessly connected to the access apparatus 2810. The wired devices 2830 are connected to the LAN port 2814.

The central office 2100 can include, but is not limited to, the analytics engine 2110, the controller 2120, servers, switches, transceivers, optical line terminal, and other equipment configured to transmit or stream downstream signals including data, content, and commands to the customer premises and receive upstream signals including telemetry data from the customer premises via the PON system 2300, Ethernet, wired, and wireless communication paths.

The controller 2120 can control or manage the switch controller 2510 to enable or disable the switches 2525 and 2535, which results in a power cycling of subtended devices. In some implementations, the controller 2120 can receive heartbeat messages from the subtended devices including the switch controller 2510, the ONU 2520, the ONU 2530, the access apparatus 2710, the access apparatus 2810, or combinations thereof. The controller 2120 can initiate a power cycle in case of an absence of a heartbeat message for a defined period of time, in case there is a defined number of absences, or combinations thereof. In some implementations, the controller 2120 can ping subtended devices. The controller 2120 can initiate a power cycle in case a response to the ping is not received in a defined period of time, in case there is a defined number of missing responses, or combinations thereof.

The analytics engine 2110 can receive telemetry data from the switch controller 2510, the ONU 2520, the ONU 2530, the access apparatus 2710, the access apparatus 2810, the wireless devices 2720, the wireless devices 2820, the wired devices 2830, or combinations thereof. The analytics engine 2110 can detect patterns or predict operability changes based on the telemetry data and send commands to the controller 2120 to initiate power cycling of the appropriate device.

The switch controller 2510 is a uniquely addressable or identifiable switch controller. In some implementations, the switch controller 2510 is an IP addressable switch controller. The switch controller 2510 turns power off and on to subtended devices based on control or command signals received from the controller 2120. This results in power cycling of the appropriate subtended devices. In some implementations, the switch controller 2510 can send heartbeat messages to the analytics engine 2110, the controller 2120, or combinations thereof. In some implementations, the switch controller 2510 can send response messages to the analytics engine 2110, the controller 2120, or combinations thereof in response to ping or maintenance (collectively "ping") messages sent by the controller 2120. In some implementations, the switch controller 2510 can send telemetry data to the analytics engine 2110.

The DC power supply 2600 can be a DC converter device which is plugged into a mains power supply at a customer premises. The DC power supply 2600 together with the PoE enabled devices enable centralized distribution of power and communications to the customer premises. Placement of the subtended devices are not dependent on main power outlets and can be placed for service effectiveness in the customer premises.

The PoE system including the PoE source 2522, the PoE source 2532, the PoE sink 2712, the PoE sink 2812, and associated PoE connectors or cabling can carry signals and power from the ONU 2520 and the ONU 2530 to the access apparatus 2710 and access apparatus 2810, respectively. The PoE source 2522, the PoE source 2532, the PoE sink 2712, and the PoE sink 2812 are circuits, devices and/or combinations thereof.

The ONU 2520 and the ONU 2530 can act as a termination device for the PON system 2300. Each of the ONU 2520 and the ONU 2530 can include a PoE source 2522 and PoE source 2532, respectively, to transmit power to the access apparatus 2710 and access apparatus 2810, respectively. In some implementations, the ONU 2520 and the ONU 2530 can be uniquely addressable or identifiable. In some implementations, the ONU 2520 and the ONU 2530 can be IP addressable. In some implementations, the ONU 2520 and the ONU 2530 can send heartbeat messages to the analytics engine 2110, the controller 2120, or combinations thereof. In some implementations, the ONU 2520 and the ONU 2530 can send response messages to the analytics engine 2110, the controller 2120, or combinations thereof in response to ping messages sent by the controller 2120. In some implementations, the ONU 2520 and the ONU 2530 can send telemetry data to the analytics engine 2110.

The access apparatus 2710 and access apparatus 2810 can be, but is not limited to, a base station, an access point, an access node, wireless router, or like device which enables radio communications access for the wireless devices. In some implementations, the access apparatus 2710 and access apparatus 2810 can include a LAN port 2714 and LAN port 2814, respectively, to provide Ethernet connection for wired devices. The access apparatus 2710 and access apparatus 2810 can include a PoE sink 2712 and PoE sink 2812, respectively, to receive signals and power from the ONU 2520 and the ONU 2530, respectively. In some implementations, the access apparatus 2710 and access apparatus 2810 can be uniquely addressable or identifiable. In some implementations, the access apparatus 2710 and access apparatus 2810 can be IP addressable. In some implementations, the access apparatus 2710 and access apparatus 2810 can send heartbeat messages to the analytics engine 2110, the controller 2120, or combinations thereof. In some implementations, the access apparatus 2710 and access apparatus 2810 can send response messages to the analytics engine 2110, the controller 2120, or combinations thereof in response to ping messages sent by the controller 2120. In some implementations, the access apparatus 2710 and access apparatus 2810 can send telemetry data to the analytics engine 2110.

The wireless devices 2720, the wireless devices 2820, and the wired devices 2830 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the access apparatus 2710 and/or the access apparatus 2810, respectively.

Operationally and functionally, the network architecture 2000 operates and functions as described for the network architecture 1000 except with the use of the PON system, the ONUs and the lack of cable modems.

Figure 3:
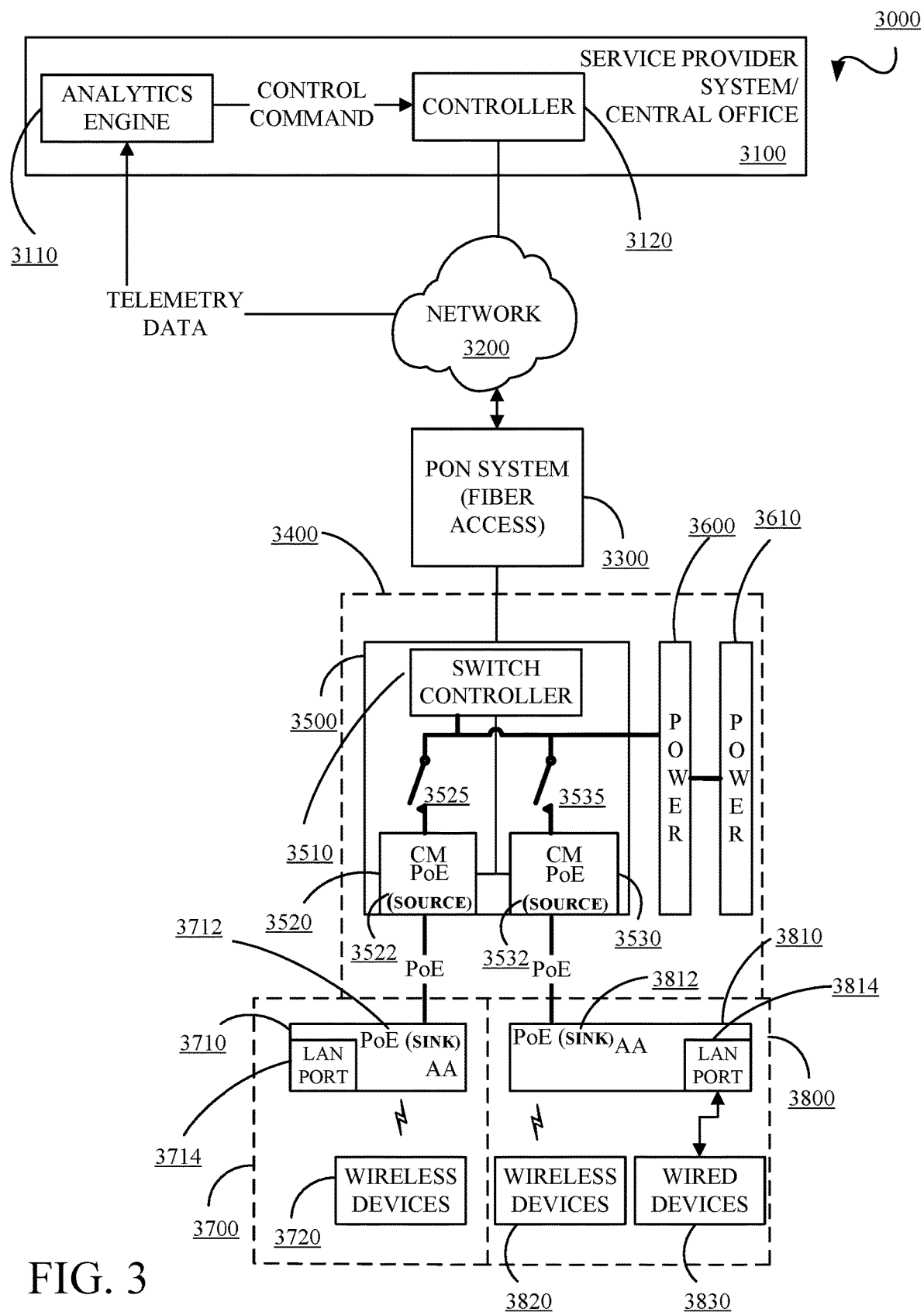
FIG. 3 is a diagram of an example of a network architecture in accordance with embodiments of this disclosure.

FIG. 3 is a diagram of an example network architecture 3000 in accordance with some embodiments. The architecture 3000 can include a service provider central office, hub, or headend (collectively "central office") 3100 which can provide services to customer premises, such as customer premises 3700 and 3800, via a network 3200, an access network, such as a PON system 3300, and communications closet 3400. The customer premises 3700 and 3800 can be LU in a residence, DUs in a MDU, office space, and the like. The customer premises can be physically separated and/or logically separated (as between different owners or tenants). Communications between the described elements and components contained therein can include wired communications, wireless communications, or a combination thereof. The quantity of described devices or elements is illustrative. The network architecture 3000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The central office 3100 can include an analytics engine 3110 and a controller 3120. The communications closet 3400 can include a centralized power distribution device 3500 and a DC power supply 3600. In some implementations, the communications closet 3400 can include a back-up power supply 3610. The centralized power distribution device 3500 can include, but is not limited to, a switch controller 3510 and one or more cable modems, such as cable modem 3520 and cable modem 3530, corresponding to the number of customer premises being served by the communications closet 3400 or the centralized power distribution device 3500. The cable modem 3520 can include a PoE source 3522 and the cable modem 3530 can include a PoE source 3532. The customer premises 3700 can include, but is not limited to, an access apparatus 3710 and one or more user devices, such as wireless devices 3720. The customer premises 3800 can include, but is not limited to, an access apparatus 3810 and one or more user devices, such as wireless devices 3820 and wired devices 3830. The access apparatus 3710 can include, but is not limited to, a PoE sink 3712 and a LAN port 3714. The access apparatus 3810 can include, but is not limited to, a PoE sink 3812 and a LAN port 3814.

The analytics engine 3110 is connected to the controller 3120, both of which are in turn connected to the network 3200. The network 3200 is connected to the PON system 3300. The PON system 3300 is connected to the switch controller 3510, the cable modem 3520/PoE source 3522, and the cable modem 3530/PoE source 3532. The PoE source 3522 and the PoE source 3532 are connected to the DC power supply 3600 via switches 3525 and 3535, respectively. The DC power supply 3600 is connected to the back-up power supply 3610, if available. The switch controller 3510 is connected to the switches 3525 and 3535. The PoE source 3522 and the PoE source 3532 are connected to the PoE sink 3712 and the PoE sink 3812, respectively. The wireless devices 3720 are wirelessly connected to the access apparatus 3710. The wireless devices 3820 are wirelessly connected to the access apparatus 3810. The wired devices 3830 are connected to the LAN port 3814.

The central office 3100 can include, but is not limited to, the analytics engine 3110, the controller 3120, servers, switches, transceivers, optical line terminal, and other equipment configured to transmit or stream downstream signals including data, content, and commands to the customer premises and receive upstream signals including telemetry data from the customer premises via the PON system 3300, Ethernet, wired, and wireless communication paths.

The controller 3120 can control or manage the switch controller 3510 to enable or disable the switches 3525 and 3535, which results in a power cycling of subtended devices. In some implementations, the controller 3120 can receive heartbeat messages from the subtended devices including the switch controller 3510, the cable modem 3520, the cable modem 3530, the access apparatus 3710, the access apparatus 3810, or combinations thereof. The controller 3120 can initiate a power cycle in case of an absence of a heartbeat message for a defined period of time, in case there is a defined number of absences, or combinations thereof. In some implementations, the controller 3120 can ping subtended devices. The controller 3120 can initiate a power cycle in case a response to the ping is not received in a defined period of time, in case there is a defined number of missing responses, or combinations thereof.

The analytics engine 3110 can receive telemetry data from the switch controller 3510, the cable modem 3520, the cable modem 3530, the access apparatus 3710, the access apparatus 3810, the wireless devices 3720, the wireless devices 3820, the wired devices 3830, or combinations thereof. The analytics engine 3110 can detect patterns or predict operability changes based on the telemetry data and send commands to the controller 3120 to initiate power cycling of the appropriate device.

The switch controller 3510 is a uniquely addressable or identifiable switch controller. In some implementations, the switch controller 3510 is an IP addressable switch controller. The switch controller 3510 turns power off and on to subtended devices based on control or command signals received from the controller 3120. This results in power cycling of the appropriate subtended devices. In some implementations, the switch controller 3510 can send heartbeat messages to the analytics engine 3110, the controller 3120, or combinations thereof. In some implementations, the switch controller 3510 can send response messages to the analytics engine 3110, the controller 3120, or combinations thereof in response to ping or maintenance (collectively "ping") messages sent by the controller 3120. In some implementations, the switch controller 3510 can send telemetry data to the analytics engine 3110.

The DC power supply 3600 can be a DC converter device which is plugged into a mains power supply at a customer premises. The DC power supply 3600 together with the PoE enabled devices enable centralized distribution of power and communications to the customer premises. Placement of the subtended devices are not dependent on main power outlets and can be placed for service effectiveness in the customer premises.

The PoE system including the PoE source 3522, the PoE source 3532, the PoE sink 3712, the PoE sink 3812, and associated PoE connectors or cabling can carry signals and power from the cable modem 3520 and the cable modem 3530 to the access apparatus 3710 and access apparatus 3810, respectively. The PoE source 3522, the PoE source 3532, the PoE sink 3712, and the PoE sink 3812 are circuits, devices and/or combinations thereof.

The cable modem 3520 and the cable modem 3530 can be cable modems, cable modem routers, and like devices which act as a termination device for the PON system 3300. Each of the cable modem 3520 and the cable modem 3530 can include a PoE source 3522 and PoE source 3532, respectively, to transmit power to the access apparatus 3710 and access apparatus 3810, respectively. In some implementations, the cable modem 3520 and the cable modem 3530 can be uniquely addressable or identifiable. In some implementations, the cable modem 3520 and the cable modem 3530 can be IP addressable. In some implementations, the cable modem 3520 and the cable modem 3530 can send heartbeat messages to the analytics engine 3110, the controller 3120, or combinations thereof. In some implementations, the cable modem 3520 and the cable modem 3530 can send response messages to the analytics engine 3110, the controller 3120, or combinations thereof in response to ping messages sent by the controller 3120. In some implementations, the cable modem 3520 and the cable modem 3530 can send telemetry data to the analytics engine 2110.

The access apparatus 3710 and access apparatus 3810 can be, but is not limited to, a base station, an access point, an access node, wireless router, or like device which enables radio communications access for the wireless devices. In some implementations, the access apparatus 3710 and access apparatus 3810 can include a LAN port 3714 and LAN port 3814, respectively, to provide Ethernet connection for wired devices. The access apparatus 3710 and access apparatus 3810 can include a PoE sink 3712 and PoE sink 3812, respectively, to receive signals and power from the cable modem 3520 and the cable modem 3530, respectively. In some implementations, the access apparatus 3710 and access apparatus 3810 can be uniquely addressable or identifiable. In some implementations, the access apparatus 3710 and access apparatus 3810 can be IP addressable. In some implementations, the access apparatus 3710 and access apparatus 3810 can send heartbeat messages to the analytics engine 3110, the controller 3120, or combinations thereof. In some implementations, the access apparatus 3710 and access apparatus 3810 can send response messages to the analytics engine 3110, the controller 3120, or combinations thereof in response to ping messages sent by the controller 3120. In some implementations, the access apparatus 3710 and access apparatus 3810 can send telemetry data to the analytics engine 3110.

The wireless devices 3720, the wireless devices 3820, and the wired devices 3830 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the access apparatus 3710 and/or the access apparatus 3810, respectively.

Operationally and functionally, the network architecture 3000 operates and functions as described for the network architecture 1000 except with the use of the PON system and the cable modems in the centralized power distribution device.

Figure 4:
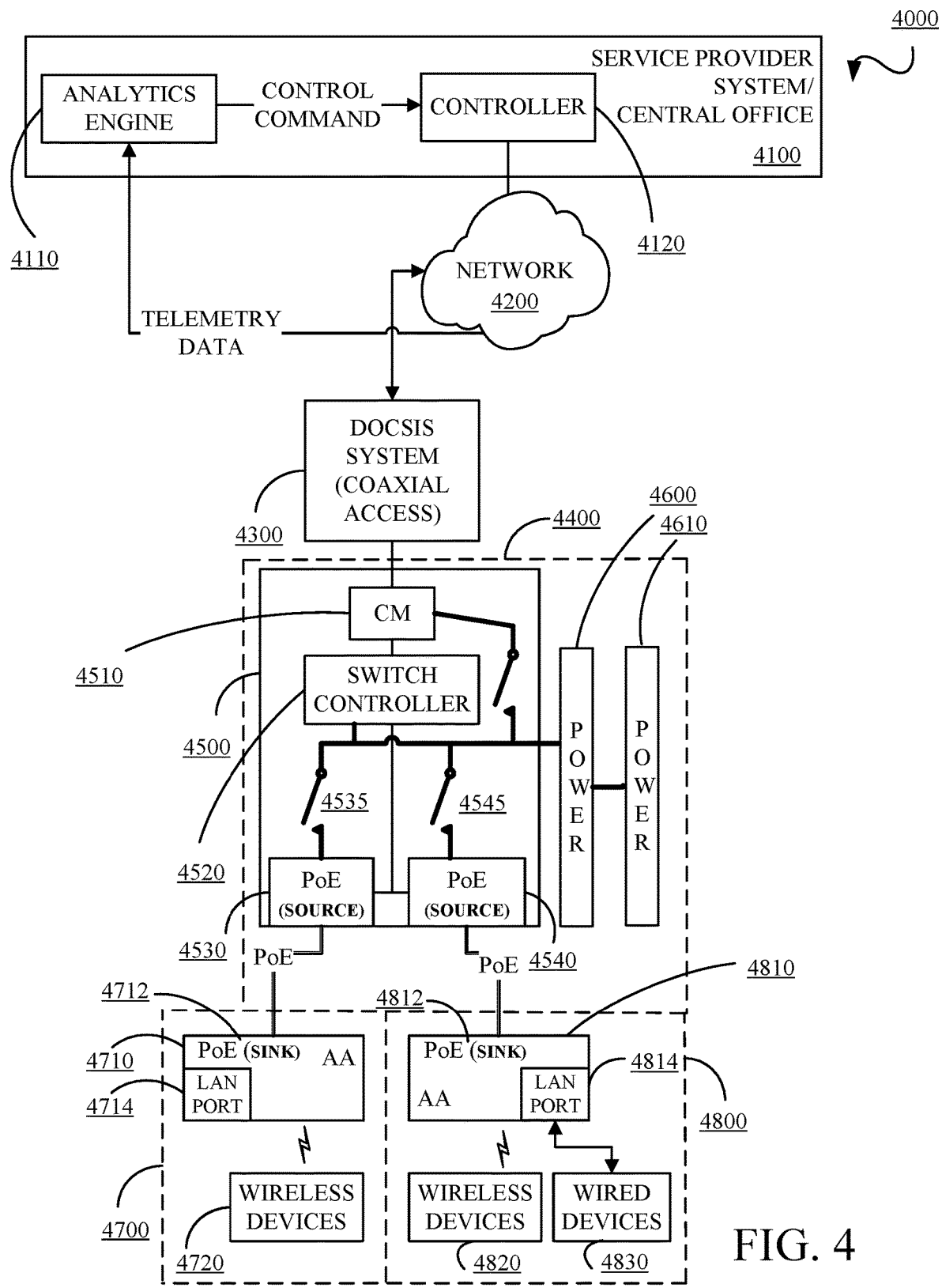
FIG. 4 is a diagram of an example of a network architecture in accordance with embodiments of this disclosure.

FIG. 4 is a diagram of an example network architecture 4000 in accordance with some embodiments. The architecture 4000 can include a service provider central office, hub, or headend (collectively "central office") 4100 which can provide services to customer premises, such as customer premises 4700 and 4800, via a network 4200, an access network, such as a DOCSIS system 4300, and a communications closet 4400. The customer premises 4700 and 4800 can be LUs in a residence, DUs in a MDU, office space, and the like. The customer premises can be physically separated and/or logically separated (as between different owners or tenants). Communications between the described elements and components contained therein can include wired communications, wireless communications, or a combination thereof. The quantity of described devices or elements is illustrative. The network architecture 4000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The central office 4100 can include an analytics engine 4110 and a controller 4120. The communications closet 4400 can include a centralized power distribution device 4500 and a DC power supply 4600. In some implementations, the communications closet 4400 can include a back-up power supply 4610. The centralized power distribution device 4500 can include, but is not limited to, a cable modem 4510, a switch controller 4520 and one or more PoE sources, such as PoE source 4530 and PoE source 4540, corresponding to the number of customer premises being served by the communications closet 4400 or the centralized power distribution device 4500. The customer premises 4700 can include, but is not limited to, an access apparatus 4710 and one or more user devices, such as wireless devices 4720. The customer premises 4800 can include, but is not limited to, an access apparatus 4810 and one or more user devices, such as wireless devices 4820 and wired devices 4830. The access apparatus 4710 can include, but is not limited to, a PoE sink 4712 and a LAN port 4714. The access apparatus 4810 can include, but is not limited to, a PoE sink 4812 and a LAN port 4814.

The analytics engine 4110 is connected to the controller 4120, both of which are in turn connected to or in communication with (collectively "connected to") the network 4200. The network 4200 is connected to the DOCSIS system 4300. The DOCSIS system 1300 is connected to the cable modem 4510, the switch controller 4520, the PoE source 4530, and the PoE 4540. The PoE source 4530 and the PoE source 4540 are connected to the DC power supply 4600 via switches 4535 and 4545, respectively. The DC power supply 4600 is connected to the back-up power supply 4610, if available. The switch controller 4520 is connected to the switches 4535 and 4545. The PoE source 4530 and the PoE source 4540 are connected to the PoE sink 4712 and the PoE sink 4812, respectively. The wireless devices 4720 are wirelessly connected to the access apparatus 4710. The wireless devices 4820 are wirelessly connected to the access apparatus 4810. The wired devices 4830 are connected to the LAN port 4814.

The central office 4100 can include, but is not limited to, the analytics engine 4110, the controller 4120, servers, switches, transceivers, optical line terminal, and other equipment configured to transmit or stream downstream signals including data, content, and commands to the customer premises and receive upstream signals including telemetry data from the customer premises via the DOCSIS system 4300, Ethernet, wired, and wireless communication paths.

The controller 4120 can control or manage the switch controller 4520 to enable or disable the switches 4535 and 4545, which results in a power cycling of subtended devices. In some implementations, the controller 4120 can receive heartbeat messages from the subtended devices including the cable modem 4510, the switch controller 4520, the access apparatus 4710, the access apparatus 4810, or combinations thereof. The controller 4120 can initiate a power cycle in case of an absence of a heartbeat message for a defined period of time, in case there is a defined number of absences, or combinations thereof. In some implementations, the controller 4120 can ping subtended devices. The controller 4120 can initiate a power cycle in case a response to the ping is not received in a defined period of time, in case there is a defined number of missing responses, or combinations thereof.

The analytics engine 4110 can receive telemetry data from the cable modem 4510, the switch controller 4520, the access apparatus 4710, the access apparatus 4810, the wireless devices 4720, the wireless devices 4820, the wired devices 4830, or combinations thereof. The analytics engine 4110 can detect patterns or predict operability changes based on the telemetry data and send commands to the controller 4120 to initiate power cycling of the appropriate device.

The cable modem 4510 can be a cable modem, a cable modem router, and like device which act as a termination device for the DOCSIS system 4300. The cable modem 4510 is a centralized, switch-based or splitter-based cable modem that directs signals accordingly toward the customer premises 4700 or 4800. The cable modem 4510 can be subtended to the switch controller 4520 with respect to power control. In some implementations, the cable modem 4510 can be uniquely addressable or identifiable. In some implementations, the cable modem 4510 can be IP addressable. In some implementations, the cable modem 4510 can send heartbeat messages to the analytics engine 4110, the controller 4120, or combinations thereof. In some implementations, the cable modem 4510 can send response messages to the analytics engine 4110, the controller 4120, or combinations thereof in response to ping messages sent by the controller 4120. In some implementations, the cable modem 4510 and the access apparatus 4810 can send telemetry data to the analytics engine 4110.

The switch controller 4520 is a uniquely addressable or identifiable switch controller. In some implementations, the switch controller 4520 is an IP addressable switch controller. The switch controller 4520 turns power off and on to subtended devices based on control or command signals received from the controller 4120. This results in power cycling of the appropriate subtended devices. In some implementations, the switch controller 4520 can send heartbeat messages to the analytics engine 4110, the controller 4120, or combinations thereof. In some implementations, the switch controller 4520 can send response messages to the analytics engine 4110, the controller 4120, or combinations thereof in response to ping or maintenance (collectively "ping") messages sent by the controller 4120. In some implementations, the switch controller 4520 can send telemetry data to the analytics engine 4110.

The DC power supply 4600 can be a DC converter device which is plugged into a mains power supply at a customer premises. The DC power supply 4600 together with the PoE enabled devices enable centralized distribution of power and communications to the customer premises. Placement of the subtended devices are not dependent on main power outlets and can be placed for service effectiveness in the customer premises.

The PoE system including the PoE source 4530, the PoE source 4540, the PoE sink 4712, the PoE sink 4812, and associated PoE connectors or cabling can carry signals and power from the centralized power distribution device 4500 to the access apparatus 4710 and access apparatus 4810, respectively. The PoE source 4530, the PoE source 4540, the PoE sink 4712, and the PoE sink 4812 are circuits, devices and/or combinations thereof.

The access apparatus 4710 and access apparatus 4810 can be, but is not limited to, a base station, an access point, an access node, wireless router, or like device which enables radio communications access for the wireless devices. In some implementations, the access apparatus 4710 and access apparatus 4810 can include a LAN port 4714 and 4814, respectively, to provide Ethernet connection for wired devices. The access apparatus 4710 and access apparatus 4810 can include a PoE sink 4712 and 4812, respectively, to receive signals and power from the PoE source 4530 and the PoE source 4540, respectively. In some implementations, the access apparatus 4710 and access apparatus 4810 can be uniquely addressable or identifiable. In some implementations, the access apparatus 4710 and access apparatus 4810 can be IP addressable. In some implementations, the access apparatus 4710 and access apparatus 4810 can send heartbeat messages to the analytics engine 4110, the controller 4120, or combinations thereof. In some implementations, the access apparatus 4710 and access apparatus 4810 can send response messages to the analytics engine 4110, the controller 4120, or combinations thereof in response to ping messages sent by the controller 4120. In some implementations, the access apparatus 4710 and access apparatus 4810 can send telemetry data to the analytics engine 4110.

The wireless devices 4720, the wireless devices 4820, and the wired devices 4830 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the access apparatus 4710 and/or the access apparatus 4810, respectively.

Operationally and functionally, the network architecture 4000 operates and functions as described for the network architecture 1000 except with the use of a switch or splitter-based cable modem in the centralized power distribution device.

Figure 5:
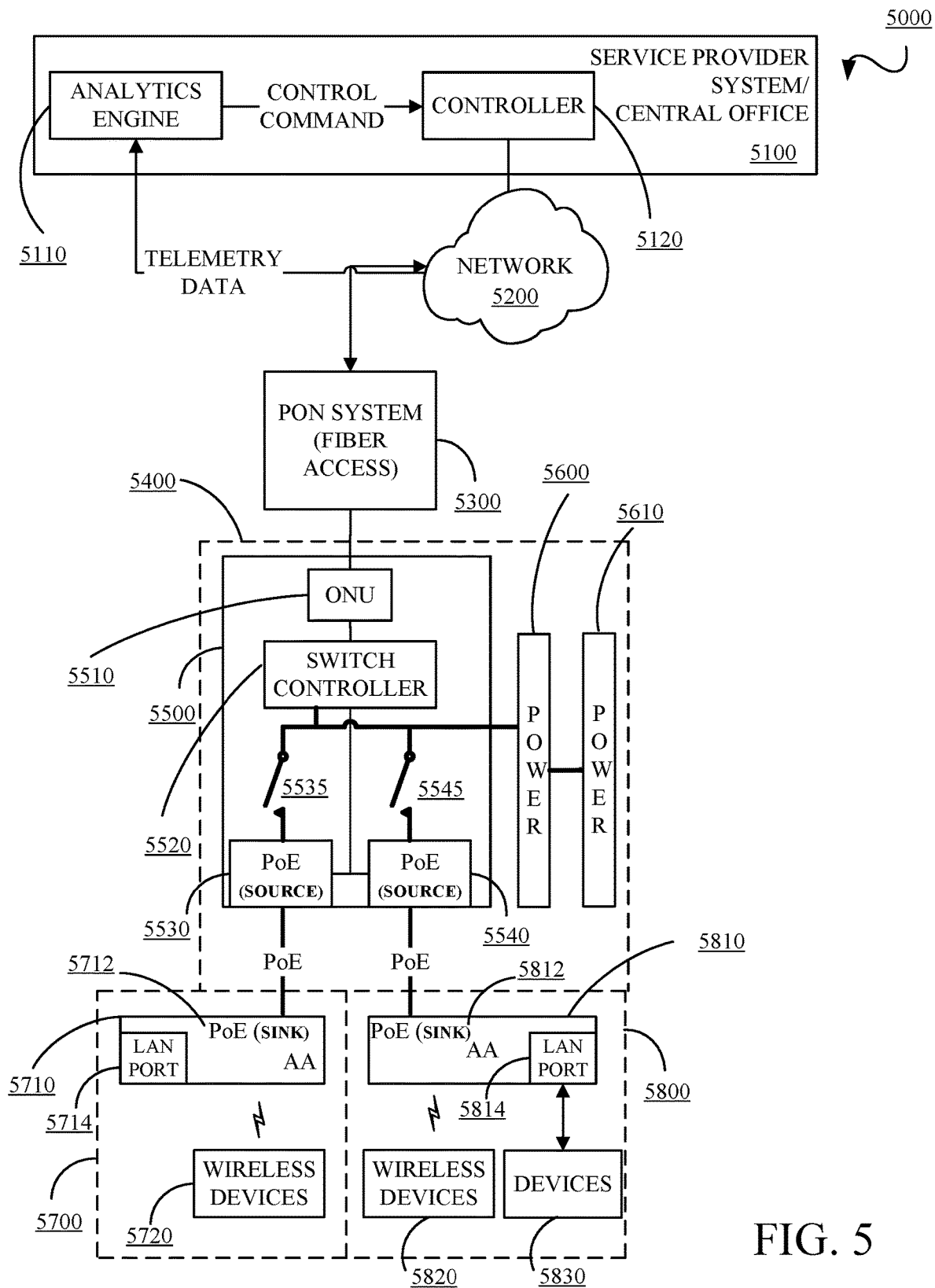
FIG. 5 is a diagram of an example of a network architecture in accordance with embodiments of this disclosure.

FIG. 5 is a diagram of an example network architecture 5000 in accordance with some embodiments. The architecture 5000 can include a service provider central office, hub, or headend (collectively "central office") 5100 which can provide services to customer premises, such as customer premises 5700 and 5800, via a network 5200, an access network, such as a PON system 5300, and a communications closet 5400. The customer premises 5700 and 5800 can be LUs in a residence, DUs in a MDU, office space, and the like. The customer premises can be physically separated and/or logically separated (as between different owners or tenants). Communications between the described elements and components contained therein can include wired communications, wireless communications, or a combination thereof. The quantity of described devices or elements is illustrative. The network architecture 5000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The central office 5100 can include an analytics engine 5110 and a controller 5120. The communications closet 5400 can include a centralized power distribution device 5500 and a DC power supply 5600. In some implementations, the communications closet 5400 can include a back-up power supply 5610. The centralized power distribution device 5500 can include, but is not limited to, a ONU 5510, a switch controller 5520 and one or more PoE sources, such as PoE source 5530 and PoE source 5540, corresponding to the number of customer premises being served by the communications closet 5400 or the centralized power distribution device 5500. The customer premises 5700 can include, but is not limited to, an access apparatus 5710 and one or more user devices, such as wireless devices 5720. The customer premises 5800 can include, but is not limited to, an access apparatus 5810 and one or more user devices, such as wireless devices 5820 and wired devices 5830. The access apparatus 5710 can include, but is not limited to, a PoE sink 5712 and a LAN port 5714. The access apparatus 5810 can include, but is not limited to, a PoE sink 5812 and a LAN port 5814.

The analytics engine 5110 is connected to the controller 5120, both of which are in turn connected to the network 5200. The network 5200 is connected to the PON system 5300. The PON system 5300 is connected to the ONU 5510, the switch controller 5520, the PoE source 5530, and the PoE 5540. The PoE source 5530 and the PoE source 5540 are connected to the DC power supply 5600 via switches 5535 and 5545, respectively. The DC power supply 5600 is connected to the back-up power supply 5610, if available. The switch controller 5520 is connected to the switches 5535 and 5545. The PoE source 5530 and the PoE source 5540 are connected to the PoE sink 5712 and the PoE sink 5812, respectively. The wireless devices 5720 are wirelessly connected to the access apparatus 5710. The wireless devices 5820 are wirelessly connected to the access apparatus 5810. The wired devices 5830 are connected to the LAN port 5814.

The central office 5100 can include, but is not limited to, the analytics engine 5110, the controller 5120, servers, switches, transceivers, optical line terminal, and other equipment configured to transmit or stream downstream signals including data, content, and commands to the customer premises and receive upstream signals including telemetry data from the customer premises via the PON system 5300, Ethernet, wired, and wireless communication paths.

The controller 5120 can control or manage the switch controller 5520 to enable or disable the switches 5535 and 5545, which results in a power cycling of subtended devices. In some implementations, the controller 5120 can receive heartbeat messages from the subtended devices including the ONU 5510, the switch controller 5520, the access apparatus 5710, the access apparatus 5810, or combinations thereof. The controller 5120 can initiate a power cycle in case of an absence of a heartbeat message for a defined period of time, in case there is a defined number of absences, or combinations thereof. In some implementations, the controller 5120 can ping subtended devices. The controller 5120 can initiate a power cycle in case a response to the ping is not received in a defined period of time, in case there is a defined number of missing responses, or combinations thereof.

The analytics engine 5110 can receive telemetry data from the ONU 5510, the switch controller 5520, the access apparatus 5710, the access apparatus 5810, the wireless devices 5720, the wireless devices 5820, the wired devices 5830, or combinations thereof. The analytics engine 5110 can detect patterns or predict operability changes based on the telemetry data and send commands to the controller 5120 to initiate power cycling of the appropriate device.

The ONU 5510 can act as a termination device for the PON system 5300. The ONU 5510 is a centralized, switch-based or splitter-based ONU that directs signals accordingly toward the customer premises 5700 or 5800. The ONU 5510 can be subtended to the switch controller 5520 with respect to power control. In some implementations, the ONU 5510 can be uniquely addressable or identifiable. In some implementations, the ONU 5510 can be IP addressable. In some implementations, the ONU 5510 can send heartbeat messages to the analytics engine 5110, the controller 5120, or combinations thereof. In some implementations, the ONU 5510 can send response messages to the analytics engine 5110, the controller 5120, or combinations thereof in response to ping messages sent by the controller 5120. In some implementations, the ONU 5510 can send telemetry data to the analytics engine 5110.

The switch controller 5520 is a uniquely addressable or identifiable switch controller. In some implementations, the switch controller 5520 is an IP addressable switch controller. The switch controller 5520 turns power off and on to subtended devices based on control or command signals received from the controller 5120. This results in power cycling of the appropriate subtended devices. In some implementations, the switch controller 5520 can send heartbeat messages to the analytics engine 5110, the controller 5120, or combinations thereof. In some implementations, the switch controller 5520 can send response messages to the analytics engine 5110, the controller 5120, or combinations thereof in response to ping or maintenance (collectively "ping") messages sent by the controller 5120. In some implementations, the switch controller 5520 can send telemetry data to the analytics engine 5110.

The DC power supply 5600 can be a DC converter device which is plugged into a mains power supply at a customer premises. The DC power supply 5600 together with the PoE enabled devices enable centralized distribution of power and communications to the customer premises. Placement of the subtended devices are not dependent on main power outlets and can be placed for service effectiveness in the customer premises.

The PoE system including the PoE source 5530, the PoE source 5540, the PoE sink 5712, the PoE sink 5812, and associated PoE connectors or cabling can carry signals and power from the centralized power distribution device 5500 to the access apparatus 5710 and access apparatus 5810, respectively. The PoE source 5530, the PoE source 5540, the PoE sink 5712, and the PoE sink 5812 are circuits, devices and/or combinations thereof.

The access apparatus 5710 and access apparatus 5810 can be, but is not limited to, a base station, an access point, an access node, wireless router, or like device which enables radio communications access for the wireless devices. In some implementations, the access apparatus 5710 and access apparatus 5810 can include a LAN port 5714 and 5814, respectively, to provide Ethernet connection for wired devices. The access apparatus 5710 and access apparatus 5810 can include a PoE sink 5712 and 5812, respectively, to receive signals and power from the PoE source 5530 and the PoE source 5540, respectively. In some implementations, the access apparatus 5710 and access apparatus 5810 can be uniquely addressable or identifiable. In some implementations, the access apparatus 5710 and access apparatus 5810 can be IP addressable. In some implementations, the access apparatus 5710 and access apparatus 5810 can send heartbeat messages to the analytics engine 5110, the controller 5120, or combinations thereof. In some implementations, the access apparatus 5710 and access apparatus 5810 can send response messages to the analytics engine 5110, the controller 5120, or combinations thereof in response to ping messages sent by the controller 5120. In some implementations, the access apparatus 5710 and access apparatus 5810 can send telemetry data to the analytics engine 5110.

The wireless devices 5720, the wireless devices 5820, and the wired devices 5830 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the access apparatus 5710 and/or the access apparatus 5810, respectively.

Operationally and functionally, the network architecture 5000 operates and functions as described for the network architecture 1000 except with the use of a PON system and a switch or splitter-based ONU in the centralized power distribution device.

Figure 6:
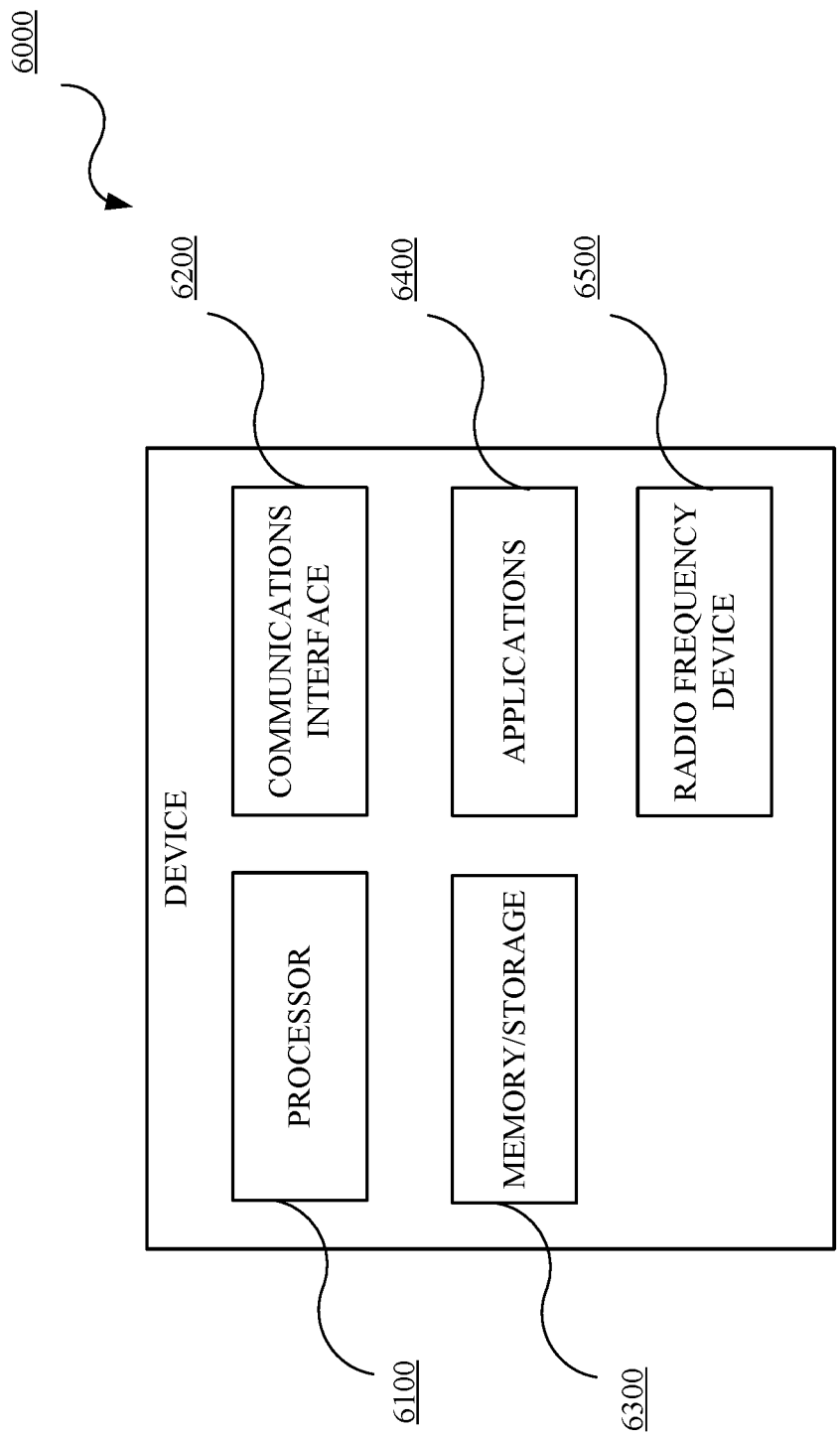
FIG. 6 is a block diagram of an example of a device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, applications 6400, and a radio frequency device 6500. The device 6000 may include or implement, for example, any of the cable modem 1710, the access apparatus 1720, the cable modem 1810, the access apparatus 1820, the wireless devices 1830, the wired devices 1840, the wired devices 1850, the access apparatus 2710, the wireless devices 2720, the access apparatus 2810, the wireless devices 2820, the wired devices 2830, the access apparatus 3710, the wireless devices 3720, the access apparatus 3810, the wireless devices 3820, the wired devices 3830, the access apparatus 4710, the wireless devices 4720, the access apparatus 4810, the wireless devices 4820, the wired devices 4830, the access apparatus 5710, the wireless devices 5720, the access apparatus 5810, the wireless devices 5820, and the wired devices 5830. The applicable or appropriate techniques or methods described herein may be stored in the memory/storage 6200 and executed by the processor 6100 in cooperation with the memory/storage 6200, the communications interface 6300, the applications 6400, and the radio frequency device 6500, as appropriate. The device 6000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 7:
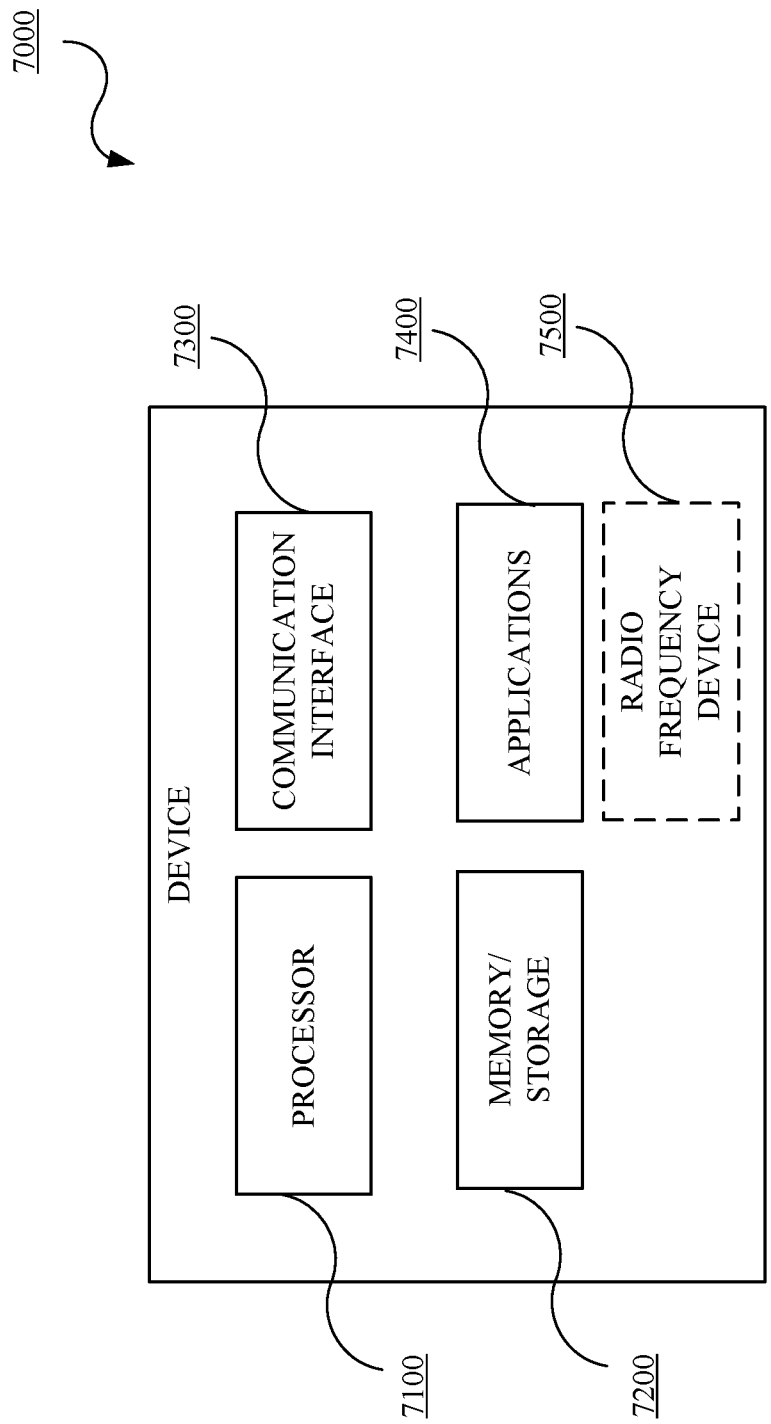
FIG. 7 is a block diagram of an example of a device in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications 7400. In some implementations, the device 7000 may include a radio frequency device 7500. The device 7000 may include or implement, for example, the cable modem 1710, the access apparatus 1720, the cable modem 1810, the access apparatus 1820, the wireless devices 1830, the wired devices 1840, the wired devices 1850, the access apparatus 2710, the wireless devices 2720, the access apparatus 2810, the wireless devices 2820, the wired devices 2830, the access apparatus 3710, the wireless devices 3720, the access apparatus 3810, the wireless devices 3820, the wired devices 3830, the access apparatus 4710, the wireless devices 4720, the access apparatus 4810, the wireless devices 4820, the wired devices 4830, the access apparatus 5710, the wireless devices 5720, the access apparatus 5810, the wireless devices 5820, the wired devices 5830, the analytics engine 1110, the controller 1120, the centralized power distribution device 1500, the analytics engine 2110, the controller 2120, the centralized power distribution device 2500, the analytics engine 3110, the controller 3120, the centralized power distribution device 3500, the analytics engine 4110, the controller 4120, the centralized power distribution device 4500, the analytics engine 5110, the controller 5120, the centralized power distribution device 5500, the ONU 2520, the ONU 2530, the cable modem 3520, the cable modem 4510, and the ONU 5510. The applicable or appropriate techniques or methods described herein may be stored in the memory/storage 7200 and executed by the processor 7100 in cooperation with the memory/storage 7200, the communications interface 7300, the applications 7400, and the radio frequency device 7500 (when applicable), as appropriate. The device 7000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 8:
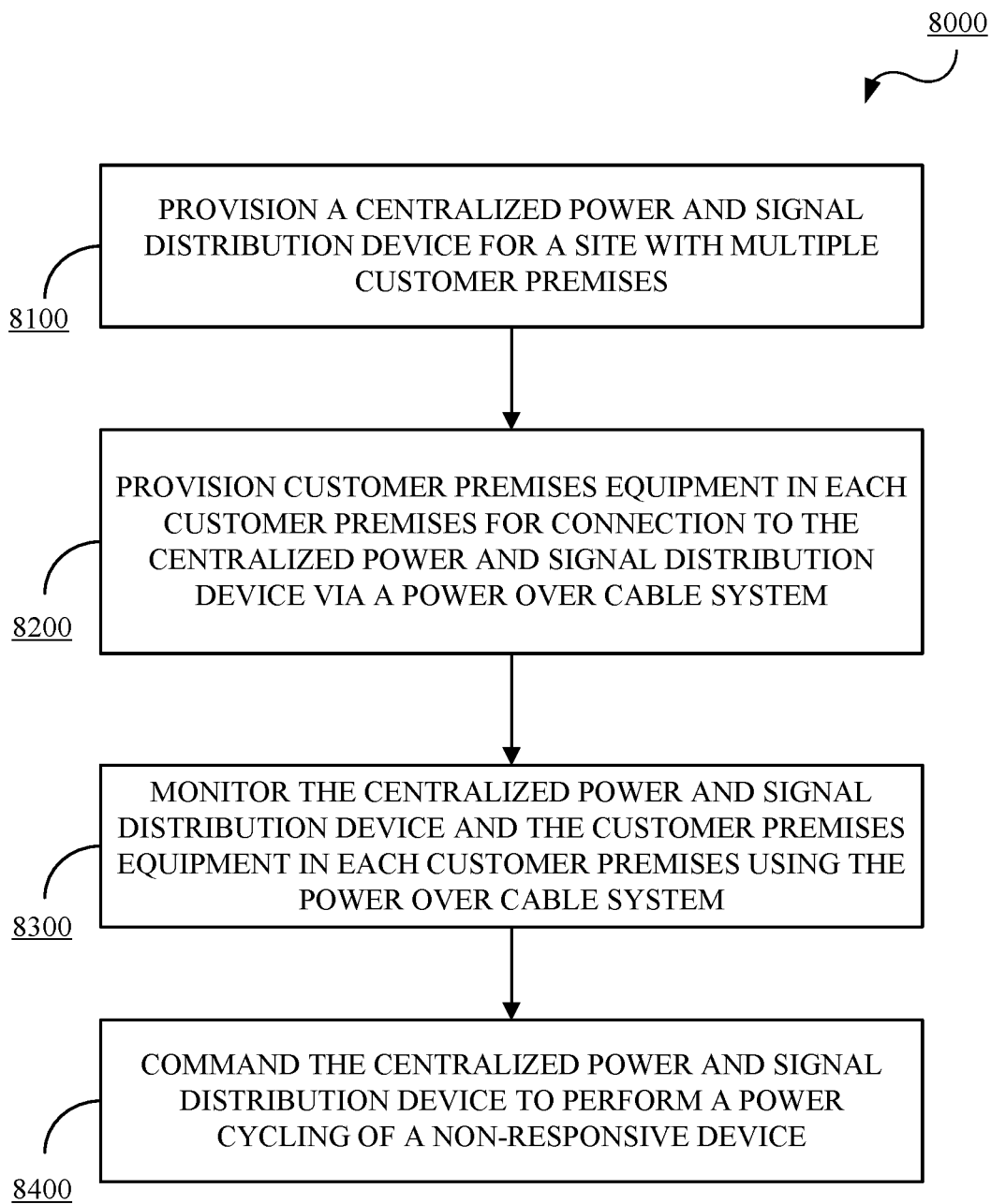
FIG. 8 is a flowchart of an example method for remote monitoring and controlling of deployed broadband and wireless equipment in accordance with embodiments of this disclosure.

FIG. 8 is a flowchart of an example method 8000 for remote monitoring and controlling of broadband and wireless equipment deployed at a customer premises in accordance with some embodiments of this disclosure. The method 8000 includes: provisioning 8100 a centralized power and signal distribution device for a site with multiple customer premises; provisioning 8200 customer premises equipment in each customer premises for connection to the centralized power and signal distribution device via a power over cable system; monitoring 8300 the centralized power and signal distribution device and the customer premises equipment in each customer premises using the power over cable system; and commanding 8400 the centralized power and signal distribution device to perform a power cycling of a non-responsive device. For example, the method 8000 may be implemented, as applicable and appropriate, by the network architecture 1000 and elements therein, by the network architecture 2000 and elements therein, by the network architecture 3000 and elements therein, by the network architecture 4000 and elements therein, by the network architecture 5000 and elements therein, the cable modem 1710, the access apparatus 1720, the cable modem 1810, the access apparatus 1820, the wireless devices 1830, the wired devices 1840, the wired devices 1850, the access apparatus 2710, the wireless devices 2720, the access apparatus 2810, the wireless devices 2820, the wired devices 2830, the access apparatus 3710, the wireless devices 3720, the access apparatus 3810, the wireless devices 3820, the wired devices 3830, the access apparatus 4710, the wireless devices 4720, the access apparatus 4810, the wireless devices 4820, the wired devices 4830, the access apparatus 5710, the wireless devices 5720, the access apparatus 5810, the wireless devices 5820, the wired devices 5830, the analytics engine 1110, the controller 1120, the centralized power distribution device 1500, the analytics engine 2110, the controller 2120, the centralized power distribution device 2500, the analytics engine 3110, the controller 3120, the centralized power distribution device 3500, the analytics engine 4110, the controller 4120, the centralized power distribution device 4500, the analytics engine 5110, the controller 5120, the centralized power distribution device 5500, the ONU 2520, the ONU 2530, the cable modem 3520, the cable modem 4510, and the ONU 5510, the device 6000, and the device 7000.

The method 8000 includes provisioning 8100 a centralized power and signal distribution device for a site with multiple customer premises. The term customer premises can refer to more than one customer premises. A site can be a residence with multiple customer premises or living units, a multi-dwelling unit with multiple customer premises or dwelling units, an office with multiple spaces, and the like. A centralized power and signal distribution device can be deployed in a communication closet. The centralized power and signal distribution device is connected to a service provider system, which can communicate signals with the centralized power and signal distribution device and control power cycling of the centralized power and signal distribution device and subtended devices. The centralized power and signal distribution device can include a switch controller connected to a DC power supply via a set of switches corresponding to the number of customer premises. The DC power supply can be connected to the mains power of the site. In some implementations, the centralized power and signal distribution device can include a distributive customer premise termination device such as a cable modem or ONU, which can direct signals to each customer premises using a switch, splitter, or other distribution technique. In some implementations, the switch controller and the distributive customer premises termination device are uniquely identifiable or IP addressable.

The method 8000 includes provisioning 8200 customer premises equipment in each customer premises for connection to the centralized power and signal distribution device via a power over cable system. Customer premises equipment can be deployed in each customer premises independent of or irrespective of main power outlets. Placement is based on providing access coverage in the customer premises not where the main power outlets are located. In some implementations, the customer premises equipment can include access apparatus. In some implementations, the customer premises equipment can include a customer premises termination device such as a cable modem or ONU. In some implementations, the access apparatus and the customer premises termination device, when present, are uniquely identifiable or IP addressable.

The method 8000 includes monitoring 8300 the centralized power and signal distribution device and the customer premises equipment in each customer premises using the power over cable system. A controller in the service provider system can receive or listen for status or operational signals from the switch controller, the customer premises termination device, and the access apparatus and other subtended devices. In some implementations, the controller can send signals to the subtended devices to determine operational connectivity and wait for responses. In some implementations, an analytics processor or server at the service provider system can receive telemetry data and status data from the subtended devices. Pattern recognition analysis can be performed to determine whether a subtended device is going to be non-operational and require a power cycle. The analytics processor or server can send a signal to the controller to initiate a power cycle as needed.

The method 8000 includes commanding 8400 the centralized power and signal distribution device to perform a power cycling of a non-responsive device. Non-receipt of signals for a defined number of times, over a defined period of time, or combinations thereof can trigger the controller to send a command to the switch controller to perform a power cycle with respect to the unresponsive device. The power cycle can be a full power cycle or a partial power cycle. The length of the waiting period for turning the power on at the unresponsive device can depend on the device type. In some implementations, an analytics engine can receive telemetry data to determine if operational failure patterns exist. A command can be sent to the controller by the analytics engine to perform a power cycle as needed. The controller and/or the analytics processor maintains or has access to defined waiting periods for device types and can control or command the switch controller accordingly. For example, the defined waiting periods for device types can be stored in a database.

In some implementations, a network deployed at a site with multiple customer premises includes a centralized power and signal distribution device deployed at a communication closet at the site, the centralized power and signal distribution device including a switch controller connected to a direct current (DC) power supply, at least one customer premises termination device connected to the switch controller, an access apparatus deployed at each of the multiple customer premises at the site, each access apparatus connected to the at least one customer premises termination device and configured to provide access to user devices, and a power over cable system configured to carry power and signals between the centralized power and signal distribution device and each access apparatus. The switch controller is configured to power cycle at least one of the switch controller, the at least one customer premises termination device, or applicable access apparatus in response to receiving a power cycle command from a controller when at least one of the switch controller, the at least one customer premises termination device, or any access apparatus fail to transmit a status signal to the controller.

In some implementations, the power cycle command varies a waiting interval for the power cycle depending on a type of the at least one of the switch controller, the at least one customer premises termination device, or the applicable access apparatus. In some implementations, the switch controller, the at least one customer premises termination device, and each access apparatus configured to transmit the status signal in response to receipt of a maintenance message from a service provider controller. In some implementations, the at least one of the switch controller, the at least one customer premises termination device, or the any access apparatus fail to transit the status signal to the controller for a defined number of times. In some implementations, the at least one of the switch controller, the at least one customer premises termination device, or the any access apparatus fail to transit the status signal to the controller after a defined period of time. In some implementations, the at least one of the switch controller, the at least one customer premises termination device, and each access apparatus is uniquely identifiable by a service provider controller. In some implementations, the at least one of the switch controller, the at least one customer premises termination device, and each access apparatus is Internet Protocol (IP) addressable by a service provider controller. In some implementations, the at least one customer premises termination device is deployed in the centralized power and signal distribution device. In some implementations, the at least one customer premises termination device is multiple customer premises termination devices, each customer premises termination device deployed at each of the multiple customer premises at the site. In some implementations, the network further includes the switch controller, the at least one customer premises termination device, and each access apparatus are configured to transit telemetry data to a service provider analytics engine, where the switch controller is configured to power cycle at least one of the switch controller, the at least one customer premises termination device, or applicable access apparatus in response to receiving a power cycle command from the controller when the analytics engine determines an operational failure pattern from the telemetry data. In some implementations, placement of each access apparatus in each of the multiple customer premises at the site is irrespective of mains power outlets.

In some implementations, a method for remote power cycling in a network deployed at a site includes provisioning a centralized power and signal distribution device for a site with multiple customer premises, provisioning customer premises equipment in each of the multiple customer premises at the site, each of the customer premises equipment connected to the centralized power and signal distribution device via a power over cable system, monitoring, by a controller, the centralized power and signal distribution device and each of the customer premises equipment in each of the multiple customer premises using the power over cable system, and commanding, by the controller, the centralized power and signal distribution device via the power over cable system to perform a power cycling of a non-responsive device, wherein the non-responsive device includes at least one of the centralized power and signal distribution device or each of the customer premises equipment.

In some implementations, the power cycling varies a turn off to on period depending on a type of the non-responsive device, the method further includes maintaining, by the controller, a database of turn off to on periods for different types of the centralized power and signal distribution device and the customer premises equipment. In some implementations, the method further includes pinging, by the controller, each of the centralized power and signal distribution device and the customer premises equipment and sending, by the controller, a command to the non-responsive device to power cycle when the non-responsive device fails to respond to the pinging by the controller. In some implementations, the method further includes reaching, by the controller, each of the centralized power and signal distribution device and the customer premises equipment by an Internet Protocol (IP) address. In some implementations, the method further includes receiving, by an analytics engine, telemetry data from each of the centralized power and signal distribution device and the customer premises equipment using the power over cable system. In some implementations, the method further includes transmitting, by the analytics engine to the controller, an instruction based on the telemetry data to send the command. In some implementations, the provisioning of the customer premises equipment is irrespective of mains power outlets in the multiple customer premises.

In some implementations, an access system includes a switch controller and direct current power supply deployed in a distribution room for a premises, the switch controller in communication with a service provider system, an access device deployed in each dwelling unit in the premises, access device deployment independent of mains power outlet availability in the dwelling unit, and a termination device deployed in one of the distribution room or in each dwelling unit, where the access device is in communication with the switch controller via a power over cable connector, the access device is in communication with the termination device, and the termination device is in communication with the service provider system and the switch controller. The switch controller is configured to power cycle at least one of the switch controller, the termination device, or applicable access device in response to receiving a command from the service provider system when at least one of the switch controller, the termination device, or any access device fail to transmit an operational message to the service provider system.

In some implementations, a waiting interval for the power cycle depends on a type of the at least one of the switch controller, the termination device, or an applicable access device.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A network deployed at a site, comprising:
a centralized power and signal distribution device deployed at the site, the centralized power and signal distribution device including a switch controller connected to a direct current (DC) power supply;
at least one customer premises termination device connected to the switch controller;
an access apparatus deployed for each customer premises at the site, each access apparatus connected to the at least one customer premises termination device and configured to provide access to user devices; and
a power over cable system configured to carry power and signals between the centralized power and signal distribution device and each access apparatus,
wherein the switch controller is configured to power cycle at least one of the switch controller, the at least one customer premises termination device, or applicable access apparatus in response to receiving a power cycle command from a controller when at least one of the switch controller, the at least one customer premises termination device, or any access apparatus fail to transmit a status signal to the controller; and
wherein the power cycle command varies a waiting interval for the power cycle depending on a type of the at least one of the switch controller, the at least one customer premises termination device, or the applicable access apparatus.

2. The network of claim 1, wherein the switch controller, the at least one customer premises termination device, and each access apparatus configured to transmit the status signal in response to receipt of a maintenance message from a service provider controller.

3. The network of claim 2, wherein the at least one of the switch controller, the at least one customer premises termination device, or the any access apparatus fail to transit the status signal to the controller for a defined number of times.

4. The network of claim 2, wherein the at least one of the switch controller, the at least one customer premises termination device, or the any access apparatus fail to transit the status signal to the controller after a defined period of time.

5. The network of claim 4, wherein the at least one of the switch controller, the at least one customer premises termination device, and each access apparatus is uniquely identifiable by a service provider controller.

6. The network of claim 4, wherein the at least one of the switch controller, the at least one customer premises termination device, and each access apparatus is Internet Protocol (IP) addressable by a service provider controller.

7. The network of claim 6, wherein the at least one customer premises termination device is deployed in the centralized power and signal distribution device.

8. The network of claim 6, wherein the at least one customer premises termination device is multiple customer premises termination devices, each customer premises termination device deployed at each of the customer premises at the site.

9. The network of claim 7, further comprising the switch controller, the at least one customer premises termination device, and each access apparatus are configured to transit telemetry data to a service provider analytics engine, wherein the switch controller is configured to power cycle at least one of the switch controller, the at least one customer premises termination device, or applicable access apparatus in response to receiving a power cycle command from the controller when the analytics engine determines an operational failure pattern from the telemetry data.

10. The network of claim 9, wherein placement of each access apparatus in each of the customer premises at the site is irrespective of mains power outlets.

11. A method for remote power cycling in a network deployed at a site, the method comprising:
provisioning a centralized power and signal distribution device for the site;
provisioning customer premises equipment in each customer premises at the site, each of the customer premises equipment connected to the centralized power and signal distribution device via a power over cable system;
monitoring, by a controller, the centralized power and signal distribution device and each of the customer premises equipment in each of the customer premises using the power over cable system; and
commanding, by the controller, the centralized power and signal distribution device via the power over cable system to perform a power cycling of a non-responsive device, wherein the non-responsive device can be at least one of the centralized power and signal distribution device or a provisioned customer premises equipment and wherein the power cycling varies a turn off to on period depending on a type of the non-responsive device.

12. The method of claim 11, the method further comprising:
maintaining, by the controller, a database of turn off to on periods for different types of the centralized power and signal distribution device and the customer premises equipment.

13. The method of claim 12, the method further comprising:
pinging, by the controller, each of the centralized power and signal distribution device and the customer premises equipment; and
sending, by the controller, a command to the non-responsive device to power cycle when the non-responsive device fails to respond to the pinging by the controller.

14. The method of claim 13, the method further comprising:
reaching, by the controller, each of the centralized power and signal distribution device and the customer premises equipment by an Internet Protocol (IP) address.

15. The method of claim 14, the method further comprising:
receiving, by an analytics engine, telemetry data from each of the centralized power and signal distribution device and the customer premises equipment using the power over cable system.

16. The method of claim 15, the method further comprising:
transmitting, by the analytics engine to the controller, an instruction based on the telemetry data to send the command.

17. The method of claim 16, wherein the provisioning of the customer premises equipment is irrespective of mains power outlets in the multiple customer premises.

18. A service access system, comprising:
a switch controller and a direct current power supply deployed at a premises, the switch controller in communication with a service provider system;
an access device deployed in each dwelling unit in the premises, access device deployment independent of mains power outlet availability in the dwelling unit; and
a termination device deployed collocated with the switch controller and direct current power supply or in each dwelling unit, wherein the access device is in communication with the switch controller via a power over cable connector, the access device is in communication with the termination device, and the termination device is in communication with the service provider system and the switch controller,
wherein the switch controller is configured to power cycle at least one of the switch controller, the termination device, or applicable access device in response to receiving a command from the service provider system when at least one of the switch controller, the termination device, or any access device fail to transmit an operational message to the service provider system, and
wherein a waiting interval for the power cycle depends on a type of the at least one of the switch controller, the termination device, or an applicable access device.

* * * * *